United States Patent [19]

Hakemi et al.

[11] Patent Number: 4,952,334
[45] Date of Patent: * Aug. 28, 1990

[54] COMPATIBLE BLENDS OF MAIN CHAIN AND SIDE CHAIN THERMOTROPIC LIQUID CRYSTAL POLYMERS

[75] Inventors: Hassan A. Hakemi, Milan, Italy; Husam A. A. Rasoul; Robert W. Stackman, both of Racine County, Wis.

[73] Assignee: S. C. Johnson & Son, Inc., Racine, Wis.

[*] Notice: The portion of the term of this patent subsequent to Jun. 27, 2006 has been disclaimed.

[21] Appl. No.: 449,221

[22] Filed: Dec. 5, 1989

Related U.S. Application Data

[63] Continuation-in-part of Ser. No. 320,355, Mar. 8, 1989, abandoned, which is a continuation of Ser. No. 111,179, Oct. 22, 1987, Pat. No. 4,842,754.

[51] Int. Cl.$^5$ .................... C09K 19/52; C09K 19/00
[52] U.S. Cl. .................... 252/299.01; 428/1; 525/55; 525/418; 525/70
[58] Field of Search ........... 252/299.01, 299.6, 299.61, 252/299.62, 299.66, 299.67, 299.68; 428/1; 525/55, 418, 63, 64, 69, 70–72, 73, 75, 76, 77, 78, 79, 80, 100, 932

[56] References Cited

U.S. PATENT DOCUMENTS 4,807,968 2/1989 Leslie et al. .................... 350/311
4,842,754 6/1989 Hakemi et al. .................... 259/299.01

FOREIGN PATENT DOCUMENTS 2585024 1/1987 France .
63260959 10/1988 Japan .................... 252/299.01

OTHER PUBLICATIONS

Dowell, F., Mol. Cryst. Liq. Cryst. 157, 203–27, 1988.

Primary Examiner—John S. Maples
Assistant Examiner—Richard Treanor

[57] ABSTRACT

This invention relates to compatible blends of liquid crystal main chain polymer and liquid crystal side polymers having the same or similar mesogenic groups.

4 Claims, 2 Drawing Sheets

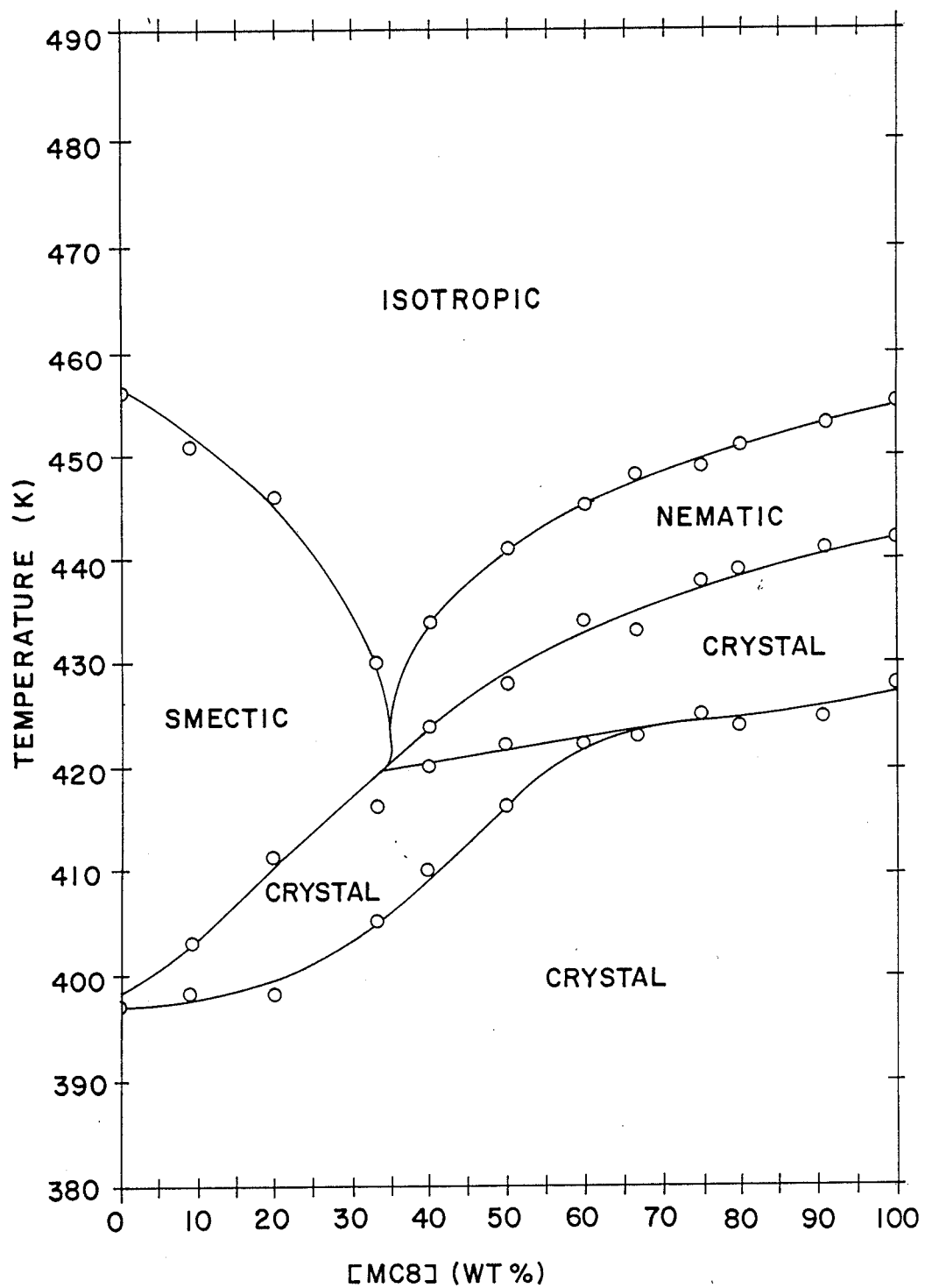
FIG_2.

COMPATIBLE BLENDS OF MAIN CHAIN AND SIDE CHAIN THERMOTROPIC LIQUID CRYSTAL POLYMERS

This is a continuation-in-part of co-pending application Ser. No. 07/320,355 filed on Mar. 8, 1989 now abandoned which in turn is a continuation of co-pending application Ser. No. 111,179 filed on Oct. 22, 1987 now U.S. Pat. No. 4,842,754.

This invention relates to thermotropic liquid crystal polymers and more particularly to the physical blending of two types of thermotropic polymeric liquid crystals. The physical blends of these polymeric liquid crystals, which are main chain and side chain polymers having the same or similar mesogenic groups, have the capacity to exhibit superior mechanical properties as compared to the original polymers.

Liquid crystals are a class of materials which exhibit properties of both the solid and liquid state over a substantial temperature range just above the melting point of the solid materials. Above the upper limit of this temperature range, liquid crystal materials exhibit properties of an isotropic liquid and below this temperature range, the materials exhibit properties of solid crystals. Within the temperature range, the materials are said to be in a mesophase, which is often described as a liquid crystal forming phase in which much of the molecular order is retained in the fluid.

Smectic liquid crystals are characterized not only by a parallelism of molecular, long axes but by a layering of the molecular centers of gravity in two dimensional planes or sheets. In nematic liquid crystals, the long axes of the molecules remain substantially parallel, but the position of the centers of gravity are more disorganized than in smectic liquid crystals. Thermotropic liquid crystals result from the melting of mesogenic (liquid-crystal forming) solids, and hence, are thermally activated mesophases.

Polymer liquid crystals can be generated by incorporating rigid segments into the polymer chain resulting in increased thermal stability and decreased solubility. It is also possible to generate polymer liquid crystals by incorporating the rigid segments as side chains in the polymer. In such a case, the polymer backbone chain approaches the random coil secondary structure and is constrained to lie between the liquid crystalline layers of side chains.

Creation of the Induced Nematic Phase (INP) from smectic mixtures has been discovered in monomeric mixtures having similar molecular structures. R. Dabrowski et al. *Liq. Cryst.* 1:415 (1986). Mixtures of side chain polymeric and low-molar mass liquid crystal compounds, both containing the same mesogenic moiety, have also been said to exhibit the nematic phase. "Phase Separations in Binary Mixtures of Nematic Liquid Crystal Side Chain Polymers and Low Molar Mass Nematic Liquid Crystals, 1 Influence of the Chemical Constitution of the Low-Molar Mass Component." H. Benthack Thomas and H. Finkelann, Makromol. Chem. 187: 2387-2400 (1986). Moreover, combining the structural principles of liquid crystal side group polymers with liquid crystal main chain polymers within one molecule has been investigated. "Combined Liquid Crystalline Polymers Mesogens in the Main Chain and as Side Groups." B. Reck and H. Ringsdorf, *Macromol. Chem., Rapid Commun.* 6:291-299 (1985).

The formation of new phases in liquid crystals is challenging from both the fundamental and application viewpoints. In low molecular weight liquid crystal systems, the possibility of establishing the Induced Smectic Phase from nematic mixtures and the Induced Nematic Phase from smectic mixtures have found some intuitive implications. The detailed nature of these induced phases is not completely understood. In polymeric systems, on the other hand, the existence of the polymeric chain contributes an additional parameter and the structure property relationship in polymeric liquid crystals is more diverse and complicated than in the low molecular weight counterparts.

The formation of new phases is not, however, always necessary in order to obtain superior mechanical properties. A much more important property in this regard is the compatibility of the polymer blend. The ability to produce such polymer blends, which have a better combination of properties than that of the individual components, depends on the overall compatibility of the system.

SUMMARY OF THE INVENTION

This invention relates to compatible blends of thermotropic liquid crystal polymers comprising:

(i) at least one main chain thermotropic liquid crystal polymer containing a repeating mesogenic unit in the polymer backbone and corresponding to Formula I as follows:

$$[-A-Y-X-Z-]_m \qquad [I]$$

wherein X is A or $(CH_2)_n$; n is an integer from about 3 to 10; and m is an integer from about 5 to 500; Y and Z are each

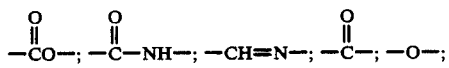

or the single bond between two carbon atoms [C—C]; and A is

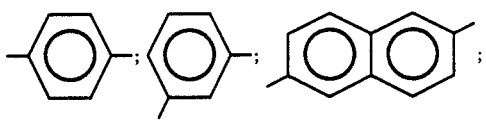

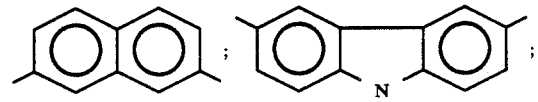

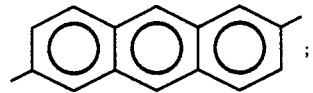

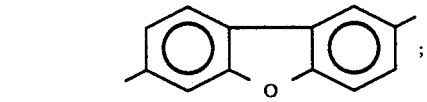

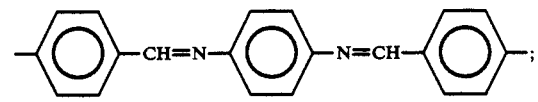

-continued

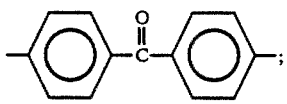

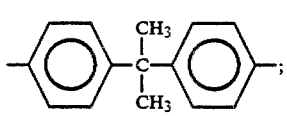

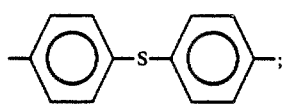

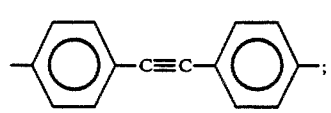

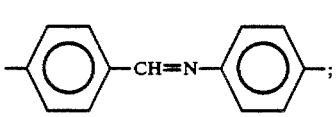

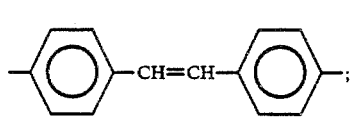

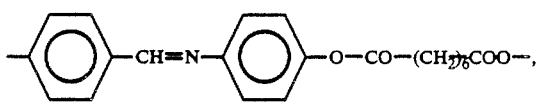

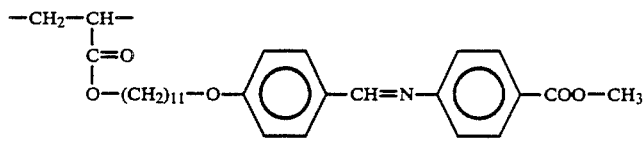

and n is as defined above, and, (ii) at least one side chain thermotropic liquid crystal polymer containing a mesogenic unit and a spacer group of about 3-20 carbons and corresponding to Formula II as follows:

$$
\begin{array}{c}
-(P)_r- \\
| \\
S \\
| \\
Y \\
| \\
A \\
| \\
Z \\
| \\
B
\end{array}
\qquad [II]
$$

wherein A, Y and Z are the same as in Formula I; S is $(CH_2)_{n_1}$, wherein $n_1$ is an integer from 3 to 20; P is the repeating unit of the backbone; r is an integer from about 5 to 1500; and B is a $C_1$ to $C_6$ aliphatic hydrocarbon or C≡N.

In more particular aspects, this invention relates to a compatible blend of a main chain liquid crystal polymer with repeating units of the following formula,

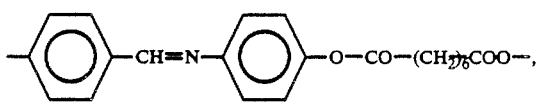

[identified as MC6 (main chain having 6 (—CH$_2$) units)] and a side chain liquid crystal polymer with repeating units of the following formula,

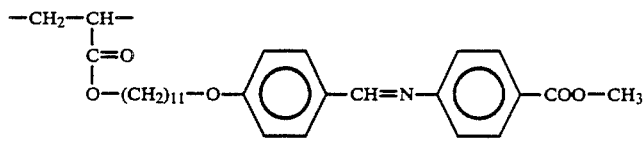

[identified as SC11 (side chain having 11 (CH$_2$) units)].

Another compatible blend within the teachings of this invention corresponds to the above blend wherein the main chain polymer repeating unit has eight methylene groups instead of six.

It is believed that a compatible blend consisting of main chain and side chain liquid crystal polymers having the same or similar mesogenic moieties in their repeating units have the capacity to exhibit superior mechanical properties.

With the present discovery, blending of main chain and side chain liquid crystal polymers in accordance with the teachings of this invention provides compatible and moldable polymer blends, which are can be employed in the preparation of high strength fibers, films and molded articles.

BRIEF DESCRIPTION OF THE DRAWINGS

FIGS. 1 and 2 represent the upper portions of the phase diagrams of MC6/SC11 and MC8/SC11 blends, respectively.

DETAILED DISCUSSION OF THE INVENTION

Figure 1:
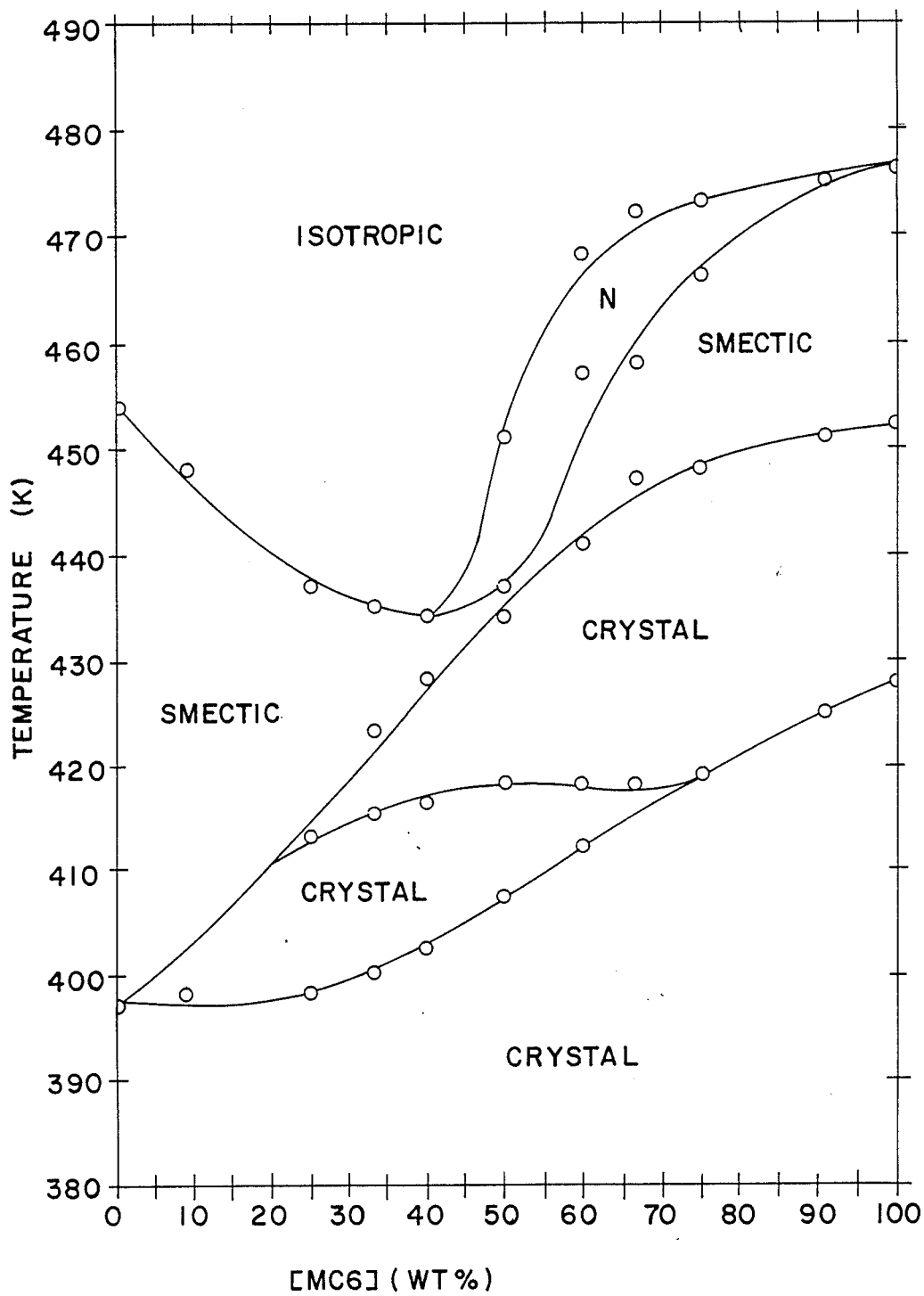

The compatible polymer blends of this invention comprise a liquid crystal main chain polymer and a liquid crystal side chain polymer. Both polymers contain the same or a similar mesogenic moiety.

The compatible polymer blends of this invention contain main chain polymers in an amount from about 1 to 99% by weight of the combined weight of the main chain and side chain polymers. Main chain polymers are usually employed in an amount of about 10-95 weight percent. More preferred ranges include 30-95 weight percent, with about 50-90 weight percent being most preferred. The side chain polymers can also be present in an amount from about 1 to 99% by weight of the combined weight of the main chain and side chain polymers. Side chain polymers are usually employed in an amount of about 5-90 weight percent. More preferred ranges include 5-70 weight percent, with about 10-50 weight percent being most preferred.

The liquid crystal main chain polymers in accordance with the teachings of this invention correspond to the repeating units of Formula I below. As shown by Formula I, these main chain polymers may be wholly aromatic and/or aromatic aliphatic, and can vary in molecular weight from approximately 1300 up to about 200,000.

$$[-A-Y-X-Z-]_m \quad [I]$$

wherein X is A or $(CH_2)_n$; n is an integer from about 3 to 10; and m is an integer from about 5 to 500; Y and Z are each

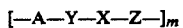

or the single bond between two carbon atoms [C—C]; and A is

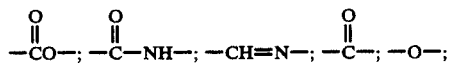

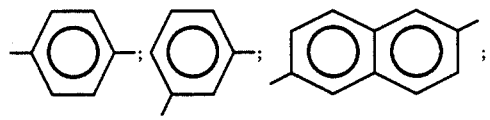

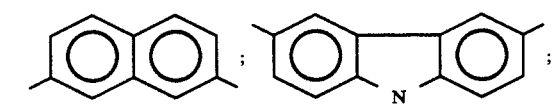

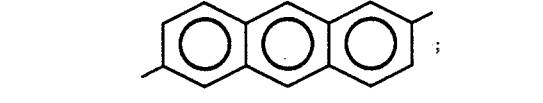

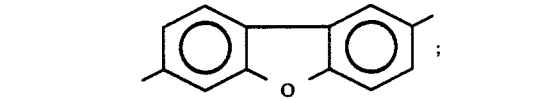

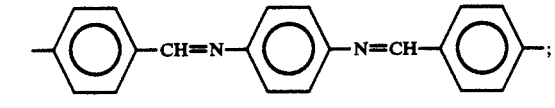

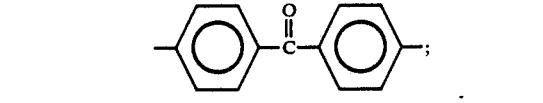

-continued

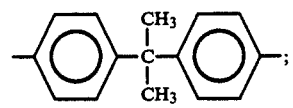

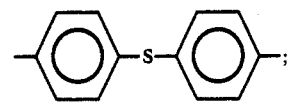

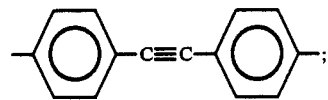

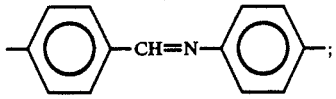

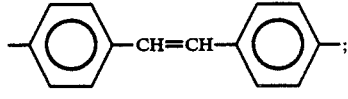

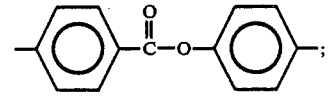

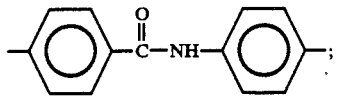

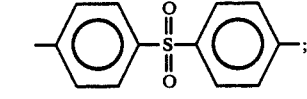

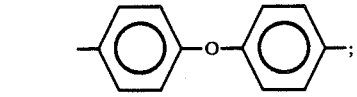

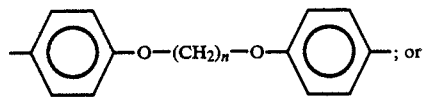

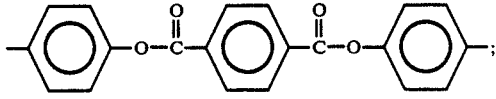

and n is as defined above.

The liquid crystal side chain polymers in accordance with the teachings of this invention correspond to the units of Formula II. The side chain polymer contains a spacer group of about 3-20 carbon atoms and a mesogenic unit such as shown by Formula II.

Side chain polymer backbones include acrylic polymeric units, methacrylic polymeric units, and condensation polymers such as polyether units, polyester units, polycarbonate units or polyamide units, and copolymers thereof.

An example of an acrylic polymeric unit is

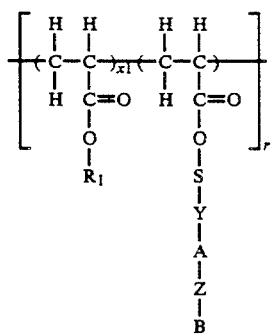

where x1 is zero or an integer between 1 and 49, inclusive, and where $R_1$ is an alkyl group of from 1 to 10 carbon atoms, inclusive;

an example of a methacrylic polymeric unit is

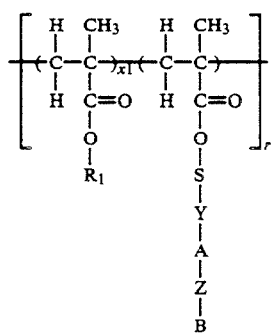

where x1 and $R_1$ are defined above;

an example of a silicone polymeric unit is

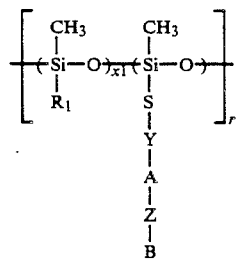

where x1 and $R_1$ are defined above;

an example of a styrene polymeric unit is

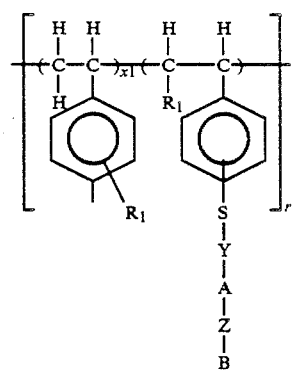

where x1 and $R_1$ are defined above;

an example of a polyether unit is

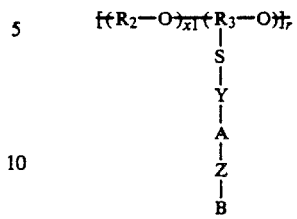

where x1 is defined above and where $R_2$ and $R_3$ are (1) either an aliphatic moiety containing 2 to 12 carbon atoms, inclusive, or (2) are an aromatic moiety containing either phenylene moieties or naphthalene moieties or substituted phenylene or naphthalene moieties, such substituted phenylene or naphthalene moieties being substituted either by an alkyl group of 1 to 10 carbon atoms, inclusive, or by a halogen selected from the group consisting of fluorine, chlorine, bromine, and iodine, and combinations of such halogens;

an example of a polyester unit is either

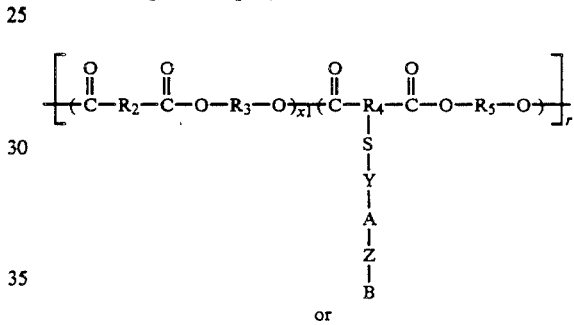

or

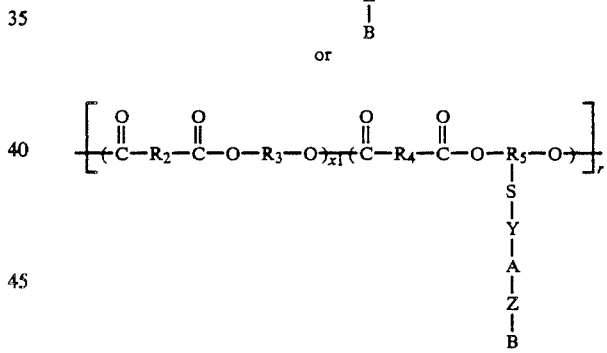

or

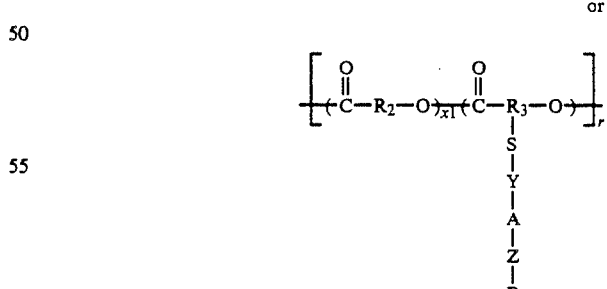

where x1, $R_2$ and $R_3$ are defined above and where $R_4$ and $R_5$ are (1) either an aliphatic moiety containing 2 to 12 carbon atoms, inclusive, or are (2) an aromatic moiety containing either phenylene moieties or naphthalene moieties or substituted phenylene or naphthalene moieties, such substituted phenylene or naphthalene moieties being substituted either by an alkyl group of 1 to 10 carbon atoms, inclusive, or by a halogen selected from the group consisting of fluorine, chlorine, bromine, and iodine, and combinations of such halogens;

an example of a polycarbonate unit is

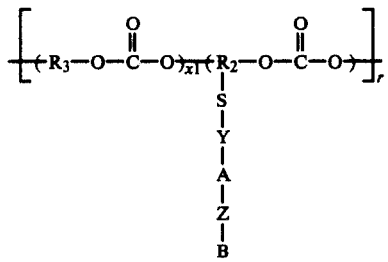

where x1, R$_2$ and R$_3$ are as defined above;

an example of a polyamide unit is either

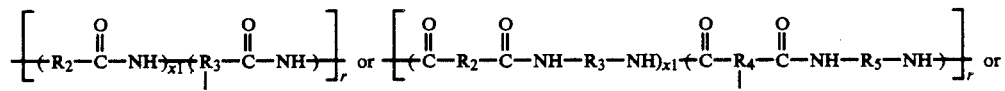

where each of x1, R$_2$, R$_3$, R$_4$ and R$_5$ are as defined above.

Examples of copolymers of such polymeric units are acrylic/methacrylic copolymers, acrylic/styrene copolymers, methacrylic/styrene copolymers, acrylic/methacrylic/styrene copolymers, polyester/polycarbonate copolymers, polyester/polyamide copolyemrs, polyether/polyester copolymers, polyether/polycarbonate copolymers, polyether/polyamide copolymers, silicone/polyether copolymers, silicone/polyester copolymers, silicone/polyamide copolymers, and silicone/polycarbonate copolymers.

Typical examples of side chain polymer backbones are given in examples (a) through (j) below. These side chain polymers correspond to Formula II.

[II]

wherein A, Y and Z are the same as in Formula I; S is (CH$_2$)n$_1$, wherein n$_1$ is an integer from about 3 to 20; P is the repeating unit of the backbone; r, the number of repeating units, is an integer from about 5 to 1500; and B is a C$_1$ to C$_6$ aliphatic hydrocarbon or C≡N.

The side chain polymers can vary in molecular weight from approximately 1,000 up to about 500,000.

Examples of typical mesogenic repeating units of main chain polymers include:

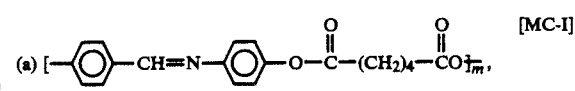

[MC-I]

which has a melting point (T$_m$) of 200°-202° C., and a clearing temperature (T$_i$) of 220°-222° C. The clearing temperature is that temperature at which the transition from the mesophase to the amorphous isotropic melt, as measured by DSC analysis, occurs. The number of repeating units, m, is about 10 to 30.

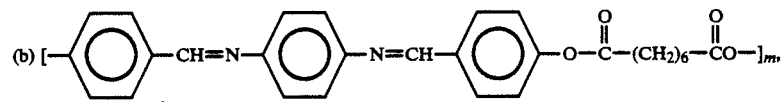

[MC-II]

which has a T$_m$ of 200° C. and a T$_i$ of 220° C. The number of repeating units, m, is about 10 to 40.

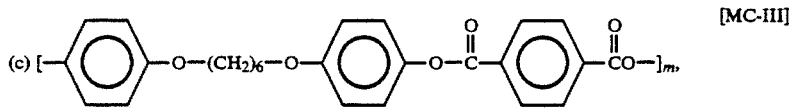

[MC-III]

which has a $T_m$ of 227° C. and a $T_i$ of 290° C. The number of repeating units, m, is about 8 to 16.

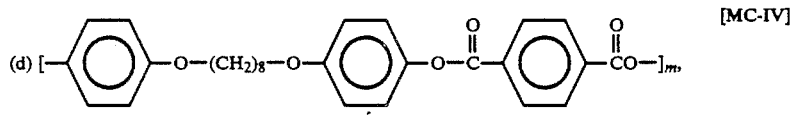

[MC-IV]

which has a $T_m$ of 165° C. and a $T_i$ of 220° C. The number of repeating units, m, is about 20 to 50.

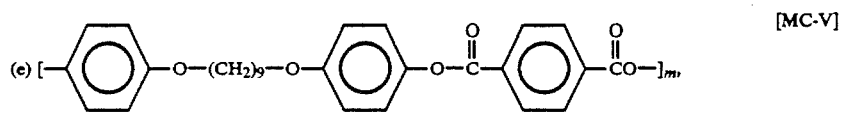

[MC-V]

which has a $T_m$ of 174° C. and a $T_i$ of 233° C. The number of repeating units, m, is about 9 to 25.

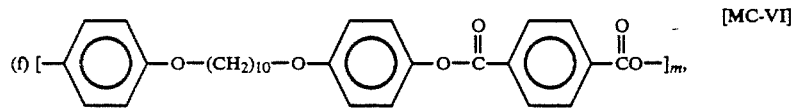

[MC-VI]

which has a $T_m$ of 220° C. and a $T_i$ of 267° C. The number of repeating units, m, is about 10 to 30.

These main chain polymers are known and can be synthesized according to the procedures given in C. Ober et al., Liquid Crystal Polymers, v. Thermotropic Polyesters with Either Dyad or Triad Aromatic Esyer Mesogenic Units and Flexible Polymethylene Spacers in the Main Chain, Polymer Journal, Vol. 14, No. 1, pp. 9-17 (1982); and Danuta Sek, Synthesis of Polyazomethinesters and Relationship between Thier Structures and Thermal Stability, Polymer Journal, Vol. 14, No. 3, pp. 173-179 (1982).

As one skilled in the art will readily recognize, the end groupings terminating the main chain polymers will be determined by their method of preparation. These end groups include —OH, —H, and halogens. Additionally, the main chain polymer repeating units in examples (c) through (g) can also be represented by the following generic structure

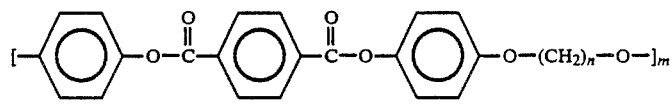

Examples of typical side chain polymers include:

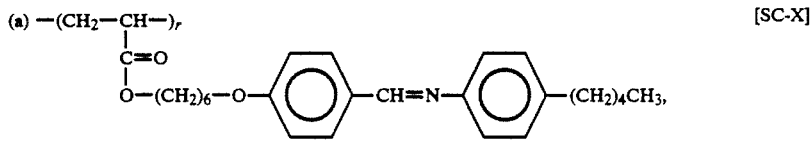

[SC-X]

which has a $T_m$ of 130° C. and a $T_i$ of 170°-180° C. The number of repeating units, r is about 3 to 20.

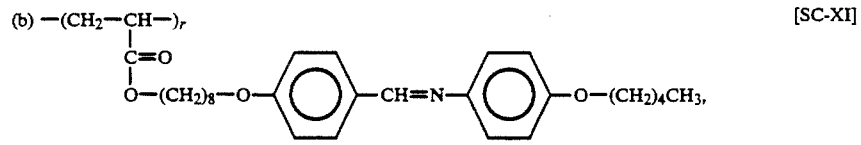

[SC-XI]

which has a $T_m$ of 130° C. and a $T_i$ of 150° C. The number of repeating units, r, is about 3 to 20.

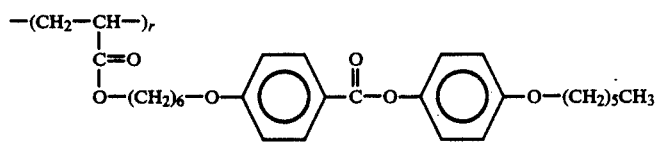

(c)

[SC-XII], which has a $T_m$ of 110° C. and a $T_i$ of 130° C. The number of repeating units, r, is about 5 to 20.

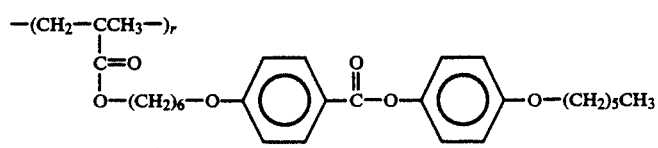

(d)

[SC-XIII], which has a $T_m$ of 100° C. and a $T_i$ of 115° C. The number of repeating units, r, is about 5 to 22.

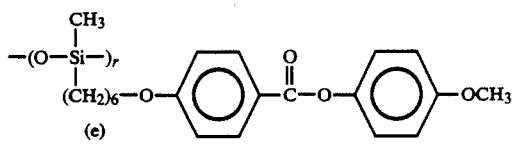

(e)

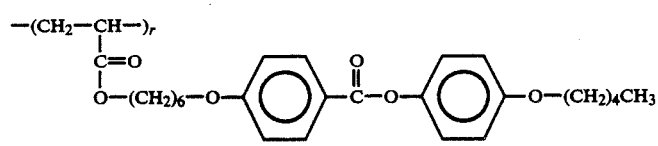

[SC-XIV], which has a $T_m$ of 115° C. and a $T_i$ of 135° C. The number of repeating units, r, is about 4 to 18.

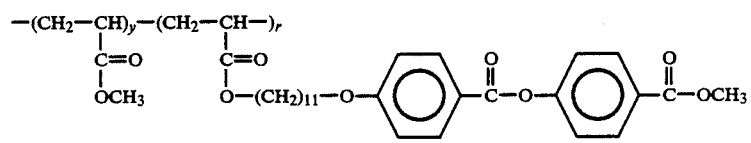

(f)

[SC-XV], which has a $T_m$ of 150° C. and a $T_i$ of 170° C. The sum of r and y is about 6 to 30, with r representing about 50 mole percent and y representing about 50 mole percent of the side chain polymer.

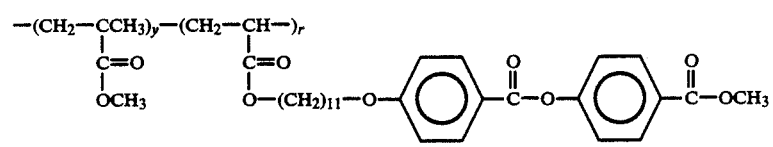

(g)

[SC-XVI], which has a $T_m$ of 130° C. and a $T_i$ of 170° C. The sum of r any y is about 6 to 30, with r representing about 25 mole percent and y representing about 75 mole percent of the side chain polymer.

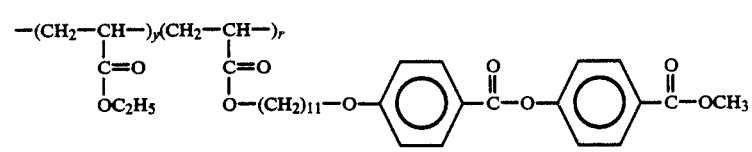

(h)

[SC-XVII], which has a $T_m$ of 125° C. and a $T_i$ of 155° C. The sum of r and y is about 10 to 40, with r representing about 15 mole percent and y representing about 85 mole percent of the side chain polymer.

[SC-XVIII], which has a $T_m$ of 60° C. and a $T_i$ of 112° C. The number repeating units, r, is about 10 to 50.

(j)

[SC-XIX], which has a $T_m$ of 53° C. and a $T_i$ of 133° C. The number of repeating units, r, is about 10 to 50.

The copolymer side chains are random copolymers, with each repeating unit having a side chain attached.

These side chain polymers are known and can be synthesized according to the procedures given in Karlyawasam P. W. Pemawansa et al., Free Radical Polymerization of Methacrylic and Acylate-Based Mesogenic Molecules, Department of Chemistry, Atlanta University; Finkelmann, H. et al., Investigations on Liquid Crystalline Polysiloxanes 2: Optical Properties of Cholesteric Phases and Influence of the Flexible Spacer on the Mobility of the Mesogenic Groups, *Makromol. Chem., Rapid. Commun.* 1, 733-740 (1980); and Gia Huynh-Ba et al., Structure and Properties of Rigid and Semirigid Liquid Crystalline Polyesters, Polymer Products Department, E. I. Du Pont de Nemours & Co., Inc.

The polymer blends of this invention are prepared by conventional polymer blending techniques such as intensive mixing of molten mixtures in mills, stirred tanks or specialized blending equipment such as a twin screw extruder.

Additionally, when using DSC pans, the polymers (main and side chain) can be physically blended at room temperature until satisfactorily mixed and then heated by controlled means until the isotropic phase is reached. Upon reaching the isotropic phase, the mixture of polymers is cooled by controlled means to room temperature. This process is repeated until equilibrium is established. In general, it usually takes 6 to 20 cycles to reach equilibrium, which is defined as the point wherein two DSC thermograms are identical.

In order that those skilled in the art can more fully understand the present invention, the following examples are set forth. These examples are given solely for purposes of illustration, and should not be considered as expressing limitations unless so set forth in the claims. All parts and percentages are by weight, unless otherwise stated.

EXAMPLES

Examples 1-22

Main chain and side chain polymers with the same mesogenic moieties in their repeat units were prepared. The two main chain liquid crystal polymers utilized in these examples correspond to repeating units of the following formula:

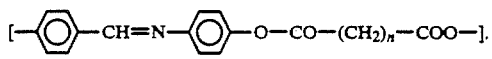

The first main chain polymer (a polyester with an azomethine mesogenic unit in the backbone) had an n value of 6 (MC6). The second main chain polymer (also a polyester with an azomethine mesogenic unit in the backbone) had an n value of 8 (MC8) and a molecular weight of 1370. The MC8 main chain polymer was prepared by mixing 5.33 grams (0.025 mole) of N (p hydroxybenzylidene)-p-hydroxy aniline with 5.05 grams of triethylamine in 100 ml of methylene chloride to which 5.277 grams (0.025 mole) of sedacoyl chloride in 100 ml of methylene chloride was added. After 30 minutes of stirring at room temperature the reaction mixture was poured into 100 ml of ethanol, filtered and dried. The MC8 polymer had a melting point of 180°-182° C. The polymerization of the MC6 main chain polymer was prepared in the same manner except that suberoyl chloride was used in place of sedacoyl chloride MC6 exhibited a smectic-A phase, while MC8 a nematic phase.

The side chain liquid crystal polymer utilized in these examples correspond to repeating units of the following formula:

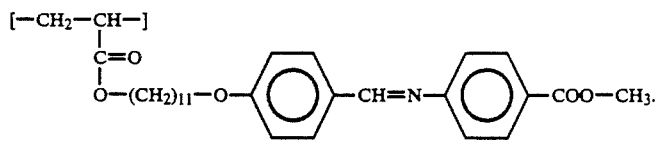

The polymer was an acrylic polymer with a spacer group of 11 carbon atoms (SC11). The molecular weight of this side chain polymer was 8660. SC11 exhibited a smectic-A phase. The SC11 side chain polymer was prepared in a polymerization tube by mixing a solution of 0.5 grams (0.001 mole) of

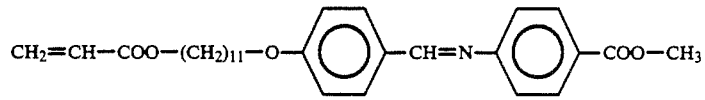

and 0.003 g of aso-bis isobutylnitrile in 2 ml of dry chloroform. The solution was degased using freeze thaw cycles, sealed under vacuum, and heated to 70° C. in an oil bath for 48 hours. The polymer was then precipitated in 100 ml methanol, filtered and washed with methanol.

Blends of MC6/SC11 and MC8/SC11 were prepared by direct mechanical mixing of the individual polymer flakes. After mixing, the blends were subjected to repeated heating cooling cycles in a DSC pan until reproducible DSC thermograms were obtained. The blends were heated at a controlled rate of 10 degrees centigrade per minute until the isotropic stage of the binary mixture was obtained. At this point the binary mixture was cooled at a controlled rate of 10 degrees centigrade per minute until room temperature was reached. These heating and cooling cycles were repeated, on the average of 8 to 11 times, until two superimposing or identical DSC thermograms were obtained.

The following blends of MC6/SC11 and MC8/SC11 were prepared. The concentration of the main chain and side chain polymer components in weight percents are given below.

| EXAMPLE | MC6/SC11 | | EXAMPLE | MC8/SC11 | |
|---|---|---|---|---|---|
| 1 | 100.0 | 0.0 | 12 | 100.0 | 0.0 |
| 2 | 91.0 | 9.0 | 13 | 91.0 | 9.0 |
| 3 | 75.0 | 25.0 | 14 | 75.0 | 25.0 |
| 4 | 67.7 | 33.3 | 15 | 67.7 | 33.3 |
| 5 | 60.0 | 40.0 | 16 | 60.0 | 40.0 |

| EXAMPLE | MC6/SC11 | | EXAMPLE | MC8/SC11 | |
|---|---|---|---|---|---|
| 6 | 50.0 | 50.0 | 17 | 50.0 | 50.0 |
| 7 | 40.0 | 60.0 | 18 | 40.0 | 60.0 |
| 8 | 33.3 | 66.7 | 19 | 33.3 | 66.7 |
| 9 | 25.0 | 75.0 | 20 | 25.0 | 75.0 |
| 10 | 9.0 | 91.0 | 21 | 9.0 | 91.0 |
| 11 | 0.0 | 100.0 | 22 | 0.0 | 100.0 |

FIGS. 1 and 2 show the upper portions of the phase diagrams of the MC6/SC11 and MC8/SC11 blends, respectively. The solid lines were drawn to distinguish phase regions and show the melting (crystal mesophase) and clearing (mesophase isotropic) temperatures. The data points are the average mid point temperatures of the corresponding phase separation range. These phase diagrams were constructed from the optical microscopic studies of the blend samples recycled in the DSC pans.

Both FIGS. 1 and 2 show the compatibility on the two geometrically different polymers, which gives the polymer blend the potential to exhibit improved properties. These improved properties can only occur in a compatible system.

Of some interest in the MC6/SC11 phase diagram is the occurrence of an INP within the concentration range of 50-80% MC. The existence of this nematic phase was unimbiguously revealed from the textural analysis of the corresponding mixtures with an optical microscope. At a concentration of 50% MC6, the INP was so enhanced that the liquid crystal structure of this mixture was predominantly a nematic phase. The INP of MC6/SC11 in FIG. 1 is designated by N.

With the exception of similarities in the solid-solid and solid-mesophase transitions, the mesomorphic phase behavior of the MC6/SC11 (FIG. 1) and MC8/SC11 (FIG. 2) polymer blends are different.

The mesomorphic behavior of these phase diagrams can be separated into two distinct regions. The region enriched with the side-chain SC11 exhibits only a smectic phase upon the addition of the MC6 (or MC8) polymer. The smectic isotropic phase transition in this composition range is broad, but shows a relatively rapid decrease as the concentration of the MC6 (or MC8) increases.

As a first order effect, destabilization of the smectic phase of the side chain SC11 polymer with the addition of the main chain impurity is a direct manifestation of the competition between the polymer chain structures in the two types of polymers, which results into a rapid deformation of the smectic layered structure of SC11. Regardless of the mesomorphic type of the main chain polymer (MC6 or MC8), the side-chain/main-chain competition may be modified by strong anisotropic interactions between the mesogenic moieties in the mixture.

As a second order effect, a more careful comparison between the two phase diagrams of FIGS. 1 and 2 shows that the smectic of SC11 is affected to a greater degree by the nematic MC8 than the smectic MC6. This suggests that an enhanced mesogenic compatibility of the SC11 and MC6 in the smectic phase may also be contributing factor to the creation of the INP.

The second important observation of the phase diagrams of FIGS. 1 and 2 is the mesophase-isotropic transition behavior in the region enriched with the main-chain components MC6 and MC8. Accordingly, the mesomorphic-isotropic phase transitions of the main-chain polymers are not affected greatly by increasing the amount of the side-chain polymer Thus by adding side-chain SC11 to main chain MC6 (or MC8), the mesophase structure of the latter system is further stabilized. This mesomorphic stabilization of the MC8/SC11 system is manifested by the constancy of its nematic range, and by slow decrease of the nematic isotropic temperatures as a function of the SC11 composition. In the MC6/SC11 system, although the smectic phase of MC6 is destabilized by the addition of the SC11, the mesomorphic structure of the binary mixture survives by formation of an INP. It is not, however, clear to what extent this enhanced anisotropic effect is due to the polymer and the mesogenic properties

Examples 23-31

Other typical examples of the compatible polymer blends of this invention are given in Examples 23-31. Preparation of these melt blends occur by mixing the indicated polymers in a 50 ml round bottomed flask, equipped with a glass stirrer paddle, which is turned by a torque controlled motor. The process is kept under a nitrogen atmosphere.

The polymer blends, as indicated below, comprise various proportions of main chain and side chain polymers. The designations MC—# and SC—# are used to abbreviate the main chain and the side chain polymer of each example These polymers were previously described above. The number in parentheses following the polymer designation indicates the weight percent of the polymer in the blend.

Heating of the flask containing the polymers occurs by submersion in an electrically heated, agitated silicone oil bath. It is recommended to discontinue heating when the molten polymer mixture is uniform. The flask is to be cooled under a nitrogen atmosphere, and the polymer blend can be recovered by breaking the flask.

| | Polymer Blends of Examples 23-31 | | |
|---|---|---|---|
| Example | Main Chain Polymer (weight %) | Side Chain Polymer (weight %) | Blending Temperature (°C.) |
| 23 | MC-I (90) | SC-X (10) | 210 |
| 24 | MC-I (85) | SC-X (15) | 210 |
| 25 | MC-I (65) | SC-X (35) | 210 |
| 26 | MC-II (90) | SC-XIII (10) | 250 |
| 27 | MC-V (75) | SC-XV (25) | 200 |
| 28 | MC-IV(90) | SC-XVII (10) | 200 |
| 29 | MC-IV(60) | SC-XVII (40) | 200 |
| 30 | MC-II (85) | SC-XVIII (15) | 250 |
| 31 | MC-II (97) | SC-XVIII (3) | 250 |

Examples 32-41

Still further typical examples of the compatible polymer blends of this invention are given in Examples 32-41. These blends can be prepared by the use of a mixing extruder such as a Werner and Pfleiderer ZSK Twin screw extruder. The mixed polymer flakes or powders are added to the inlet throat of the heated extruder. The temperatures of the mixing sections and the time of mixing are controlled by the screw design and by the rate of speed of the screws. The blended polymers can be obtained as strands at the exit end of the extruder, cooled by collection in a water trough and chopped into pellets.

| Example | Main Chain Polymer (weight %) | Side Chain Polymer (weight %) | Blending Temp(°C.) | Time (Min.) |
|---|---|---|---|---|
| 32 | MC-II (80) | SC-XII (20) | 220 | 3 |
| 33 | MC-II (96) | SC-XII (4) | 220 | 5 |
| 34 | MC-III (75) | SC-XIII (25) | 250 | 3 |
| 35 | MC-III (85) | SC-XIII (15) | 250 | 3 |
| 36 | MC-VI (95) | SC-XIII (5) | 250 | 3 |
| 37 | MC-VI (80) | SC-XIX (20) | 260 | 4 |
| 38 | MC-VI (92) | SC-XIX (8) | 270 | 2 |
| 39 | MC-VI (95) | SC-XIX (5) | 280 | 2 |
| 40 | MC-II (90) | SC-XVI (10) | 210 | 4 |
| 41 | MC-V (85) | SC-XV (15) | 220 | 2 |

Polymer Blends of Examples 32–41

Films can also be extruded from the polymer blends obtained in Examples 32–41 by use of a 30 inch single screw extruder attached to a Brabender Plasticorder, equipped with a slit film die.

This invention is not to be limited except as set forth in the claims.

We claim:

1. A compatible blend of thermotropic liquid crystal polymers comprising:

(i) at least one main chain thermotropic liquid crystal polymer containing a repeating mesogenic unit in the polymer backbone and corresponding to Formula I, $$(-A-Y-X-Z-)_m \qquad (I)$$

wherein X is A or $(CH_2)_n$; wherein n is an integer from about 3 to 10; wherein m is an integer from about 5 to 500; wherein Y and Z are either both non-existent or each $$-\overset{O}{\underset{\|}{C}}O-;\ -\overset{O}{\underset{\|}{C}}-NH-;\ -CH=N-;\ -\overset{O}{\underset{\|}{C}}-;\ -O-;$$

and wherein A is

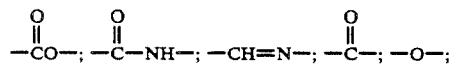

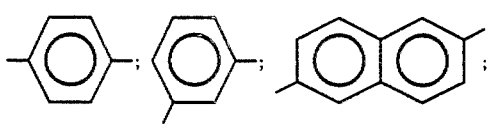

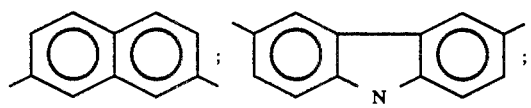

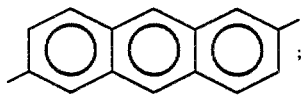

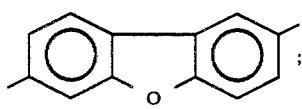

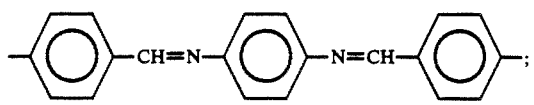

-continued

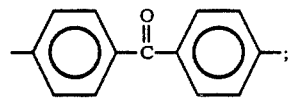

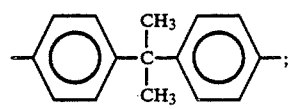

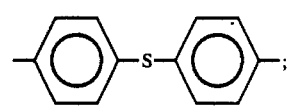

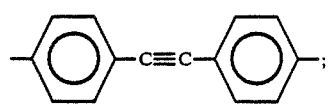

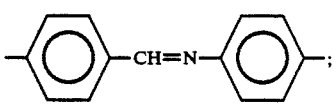

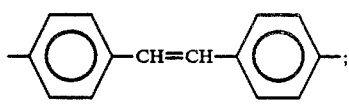

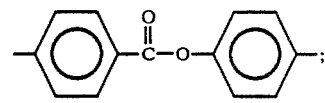

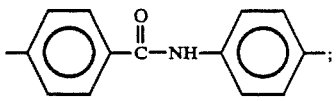

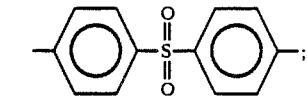

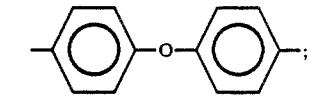

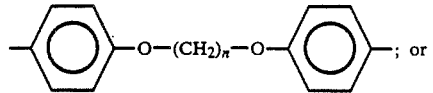

wherein n is as defined above; and, (ii) at least one side chain thermotropic liquid crystal polymer, compatible with the main chain thermotropic liquid crystal polymer and containing a mesogenic unit and a spacer group of about 3–20 carbons and corresponding to Formula II,

 (II)

wherein A, Y and Z are as defined above in Formula I; wherein S, the spacer group, is $(CH_2)n_1$, wherein $n_1$ is an integer from about 3 to 20; wherein P is the repeating unit of the side chain thermotropic liquid crystal polymer backbone; wherein r is an integer from about 5 to 1500; and wherein D is either a $C_1$ to $C_6$ aliphatic hydrocarbon or $C\equiv N$.

2. The blend of claim 1 wherein the backbone of the side chain polymers are selected from the group consisting of acrylic polymeric units, methacrylic units, styrene polymeric units, polyether units, polyester units, polycarbonate polymeric units and polyamide units, and copolymers thereof.

3. The blend of claim 1 wherein the main chain polymer is present in an amount of about 10–95 weight percent.

4. The blend of claim 1 wherein the main chain polymer is present in an amount of about 50–90 weight percent.

* * * * *

UNITED STATES PATENT AND TRADEMARK OFFICE
CERTIFICATE OF CORRECTION

PATENT NO. : 4,952,334

DATED : August 28, 1990

INVENTOR(S) : Hakemi et al.

It is certified that error appears in the above-identified patent and that said Letters Patent is hereby corrected as shown below:

Col. 4, line 55, please delete the word "are".

Col. 9, line 51, please delete "copolyemrs" and substitute the word -- copolymers -- in place thereof.

Col. 11, first line beneath the chemical structure identified as "[SC-X]", please delete "Esyer" and insert the word -- Ester -- in place thereof.

Col. 12, first line beneath the chemical structure identified as "[MC-III]", please delete "Thier" and insert the word -- Their -- in place thereof.

Col. 13, second line beneath the structure identified as "(g)", please delete "any" and substitute the word -- and -- in place thereof.

Col. 16, line 13, please insert a period [.] immediately following the word "chloride".

Col. 17, line 63, please insert the word -- a -- immediately before the word "contributing".

UNITED STATES PATENT AND TRADEMARK OFFICE
CERTIFICATE OF CORRECTION

PATENT NO. : 4,952,334

DATED : August 28, 1990

INVENTOR(S) : Hakemi et al.

It is certified that error appears in the above-identified patent and that said Letters Patent is hereby corrected as shown below:

Col. 18, line 2, please insert a period [.] immediately following the word "polymer".

Signed and Sealed this

Thirty-first Day of December, 1991

Attest:

HARRY F. MANBECK, JR.

*Attesting Officer*     *Commissioner of Patents and Trademarks*